United States Patent [19]

Auyeung et al.

[11] Patent Number: 5,486,863
[45] Date of Patent: Jan. 23, 1996

[54] METHOD FOR DETERMINING WHETHER TO INTRA CODE A VIDEO BLOCK

[75] Inventors: Cheung Auyeung; Kevin J. O'Connell, both of Palatine; Stephen N. Levine, Itasca, all of Ill.

[73] Assignee: Motorola, Inc., Schaumburg, Ill.

[21] Appl. No.: 235,611

[22] Filed: Apr. 29, 1994

[51] Int. Cl.$^6$ ..................................... H04N 7/50
[52] U.S. Cl. ..................... 348/420; 348/402; 348/415; 348/421
[58] Field of Search .................. 348/420, 421, 348/415, 400, 401, 402, 699; H04N 7/137, 7/50

[56] References Cited

U.S. PATENT DOCUMENTS

| | | | |
|---|---|---|---|
| 4,546,386 | 10/1985 | Matsumoto et al. | 348/412 |
| 4,802,006 | 1/1989 | Iinuma et al. | 348/412 |
| 4,837,618 | 6/1989 | Hatori et al. | 348/401 |
| 4,947,248 | 8/1990 | Hienerwadel et al. | 348/415 |
| 5,107,345 | 4/1992 | Lee | 348/403 |
| 5,363,205 | 11/1994 | Shou | 348/421 |
| 5,387,938 | 2/1995 | Fukuda | 348/420 |

*Primary Examiner*—Howard W. Britton
*Attorney, Agent, or Firm*—Darleen J. Stockely

[57] ABSTRACT

Whether to encode a present video block of an incoming video frame, i.e. intra code, or whether to encode the difference between the present video block of the incoming frame and a best match video block from a previously stored video frame, i.e. non-intra code, is determined in a video compression system 100. First the present video block is divided into a predetermined number of sub blocks 301. Then an average pixel value is calculated for each sub block 302 and used along with the individual pixel values of the sub block to determine sub block deviations 303. The sub block deviations are used to compute a present video block deviation 303. The present video block deviation is then compared with an error deviation 306 that is calculated based upon the present video block pixel values and the best match video block pixel values 305. If the comparison is favorable, then the difference between the present video block and the best match video block are encoded. If the comparison is unfavorable, then the present video block is encoded.

11 Claims, 3 Drawing Sheets

METHOD FOR DETERMINING WHETHER TO INTRA CODE A VIDEO BLOCK

FIELD OF THE INVENTION

The invention generally relates to the field of video compression, and in particular, to determining whether to encode a video block or whether to encode a difference between the video block and a previously stored video block.

BACKGROUND OF THE INVENTION

Video systems are known to include a plurality of communication devices and communication channels, which provide the communication medium for the communication devices. For example, the communication channel may be wireline connections or RF frequency carriers. To increase the efficiency of the video system, video that needs to be communicated is digitally compressed. The digital compression reduces the number of bits needed to represent the video while maintaining perceptual quality of the video. The reduction in bits allows more efficient use of channel bandwidth and reduces storage requirements. To achieve digital video compression, each communication device may include an encoder and a decoder. The encoder allows a communication device to compress video before transmission over a communication channel. The decoder enables the communication device to receive compressed video from a communication channel and render it visible. Communication devices that may use digital video compression include high definition television transmitters and receivers, cable television transmitters and receivers, video telephones, computers and portable radios.

Several standards for digital video compression have emerged, including International Telecommunications Union (ITU) -T Recommendation H.261, the International Standards Organization/ International Electrotechnical Committee (ISO/IEC) 11172-2 International Standard (MPEG-1), and the forthcoming ISO/IEC 13818-2 standard (MPEG-2). These standards seek to efficiently represent a sequence of frames of video by exploiting the spatial and temporal redundancies in the video and by taking advantage of the perceptual qualities of the human eye. Temporal redundancy is exploited by estimating the motion in a sequence of frames.

Block matching algorithms are a known method for estimating motion within a video sequence. Each frame of the video sequence is divided into blocks of pixels. Block matching algorithms compare a current block that is to be encoded in one frame with blocks of the same size in a previous or future frame of the video sequence. Once a matching block is found in a frame that has previously been encoded, then a decision must be made whether to encode the current block independently or whether to encode the location of the matching block and any differences between the current block and the matching block. This decision is commonly referred to as the intra/non-intra decision. If the current block is coded independently then intra coding is selected. If the location of the matching block and the differences between the current block and the matching block are encoded, then non-intra coding is selected. Encoding only the location and any difference information may provide a more efficient method of encoding.

The intra/non-intra decision tries to determine whether the current block or the difference between the current block and the matching block will be more efficient to encode. Since there are several steps beyond the intra/non-intra decision that actually determine the number of bits, i.e., efficiency of the coding, this decision is complex. To most accurately predict which encoding method is most efficient, both an intra coded and non-intra coded block would have to be encoded and a comparison of the resulting number of bits made. However, this solution requires duplicate hardware to simultaneously do both modes of encoding. This may be impractical.

Another method for determining whether to intra code or non-intra code is to calculate for each pixel in the current block, the absolute value of the difference between the average pixel value and each pixel value in the current block and then sum the values. This sum is referred to as the sum of absolute differences (SOAD) for the current block. Similarly, the sum of the absolute values of the difference between each pixel in the matching block and each pixel in the current block is calculated. This sum is referred to as the sum of absolute differences (SOAD) for the difference block. If the SOAD for the difference block is less than or equal to a certain threshold, non-intra coding is chosen. Otherwise, if the SOAD for the difference block is greater than the threshold and greater than the SOAD for the current block, then intra coding is chosen. The SOAD calculation for the current block requires for a 16 pixel by 16 pixel (16×16) video block approximately 1024 operations. For a common video sequence of 396 blocks per frame and 30 frames per second, the cost of the SOAD for the current block alone is more than 12 million operations per second. This cost is very high. However, if a careful determination of whether to intra code or non-intra code isn't made, the quality of the video is sacrificed.

Therefore, a need exists to reduce the number of operations needed to determine whether to intra code or non-intra code a video block, yet provide adequate video quality.

DESCRIPTION OF A PREFERRED EMBODIMENT

The present invention provides an efficient method for video compression by determining whether to encode a present video block of an incoming video frame or whether to encode the difference between the present video block and a best match video block of a previously stored video frame. This is accomplished by dividing the present video block into a predetermined set of sub blocks. Then calculating an average pixel value for each of the sub blocks. The average pixel values and the actual pixel values of each sub block are used to determine a sub block deviation. A present video block deviation is then calculated from the sub block deviations. An error deviation is also calculated by comparing the pixels of the present video block with the pixels of the best match video block. A comparison is made between the error deviation and the present block deviation to determine whether the present video block or the difference between the present video block and the best match video block is to be encoded.

Figure 1:
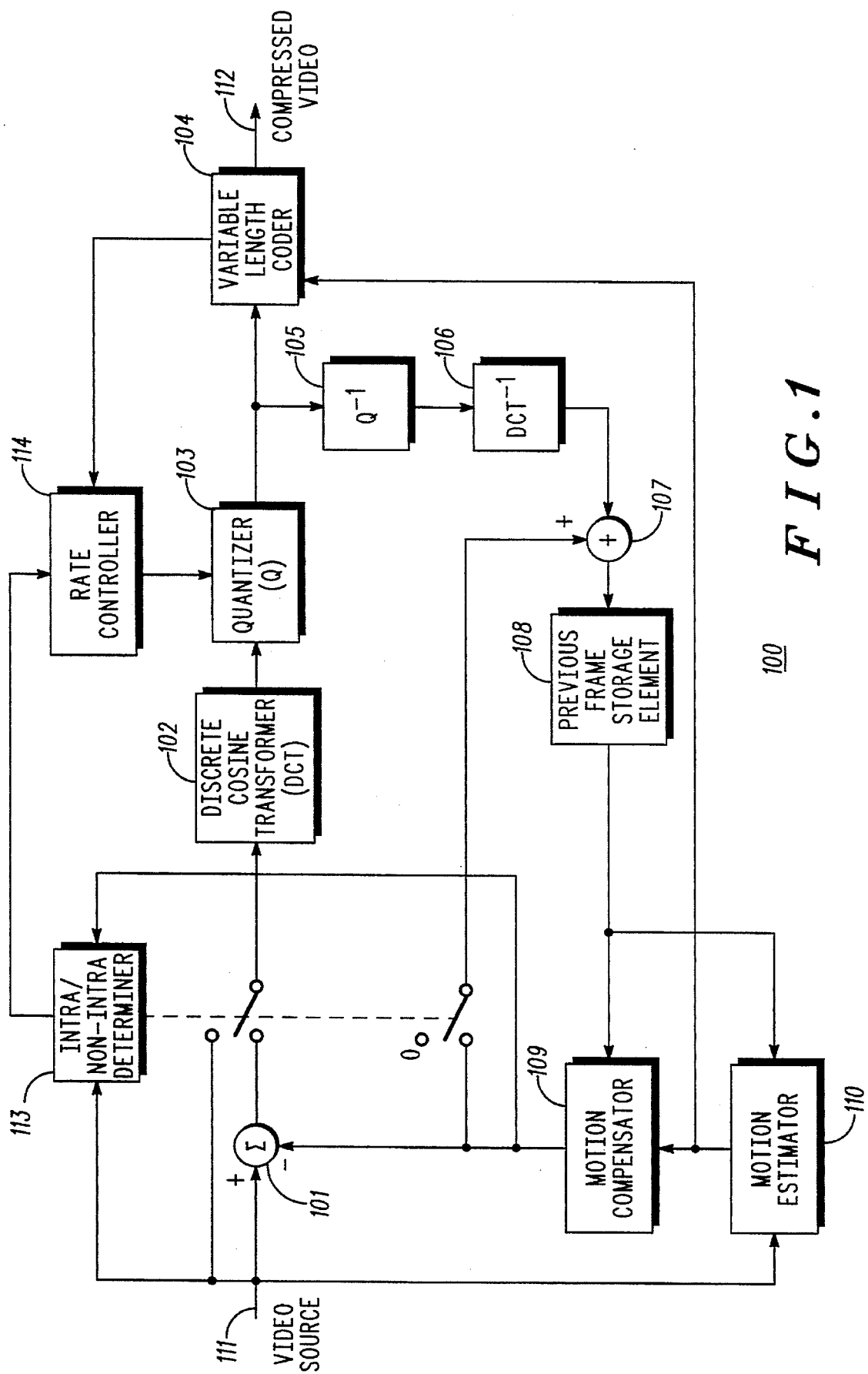
FIG. 1 illustrates a video compression system that determines whether to intra code or non-intra code video blocks in accordance with the present invention.

The present invention is more fully described with reference to FIGS. 1–4. FIG. 1 illustrates a video compression system 100 that determines whether to intra code or non-intra code a video block in accordance with the present invention. A video source 111 is received by the video compression system 100. For each present video block in the video source 111, the motion estimator 110 searches a previous frame storage element 108, which holds one or more reference pictures, to find a best match video block. A preferred method for determining the best match video block is disclosed in co-pending U.S. patent application, Ser. No. 08/236,753, filed Apr. 29, 1994, assigned to the same assignee as the present application. The motion estimator 110 produces a motion vector (MV), which describes the location of the best match video block in relation to the present video block. The motion compensator 109 uses the MV to extract the best match video block from the previous frame storage element 108. The best match video block is then subtracted from the present video block by subtractor 101, producing a residual video block. The intra/non-intra determiner 113 chooses between intra coding and non-intra coding according to the principles of the invention that are set forth herein. If intra-frame coding is chosen then the present video block is sent to the discrete cosine transformer (DCT) 102 to be encoded, otherwise the residual video block is sent to the DCT 102 to be encoded. The DCT 102 then transforms the spatial domain values of the video block it receives into frequency domain values. The frequency domain values are then scaled and truncated by the quantizer 103, introducing quantization error into the compression system 100. The amount of quantization error allowed is controlled by rate controller 114, which shares computations with the intra/non-intra determiner in accordance with the present invention. The quantized values from quantizer 103 are efficiently and losslessly encoded by the variable length coder (VLC) 104. The MV's are also efficiently and losslessly encoded by the VLC 104. The output of the VLC 104 is the compressed video 112 that may be stored or transmitted to a decompression system. A feedback loop consisting of an inverse quantizer 105, an inverse DCT 106, an adder 107, the previous frame storage element 108, and the motion compensator 109, reconstructs the same picture that the decompression system will reconstruct and stores the picture into the previous frame storage element 108. The inverse quantizer 105 followed by the inverse DCT 106 reconstructs the spatial domain values, which include the error introduced by the quantizer 103. If non-intra coding was chosen by the intra/non-intra determiner 113, then the best match video block from the motion compensator 109 is added to the output of the inverse DCT 106 by the adder 107. Otherwise zero is added to the output of the inverse DCT 106 by the adder 107. The output of the adder 107 is then stored into the previous frame storage element 108. The video compression system 100 may be implemented with software executing on one or more digital signal processors or general purpose microprocessors.

Figure 2:
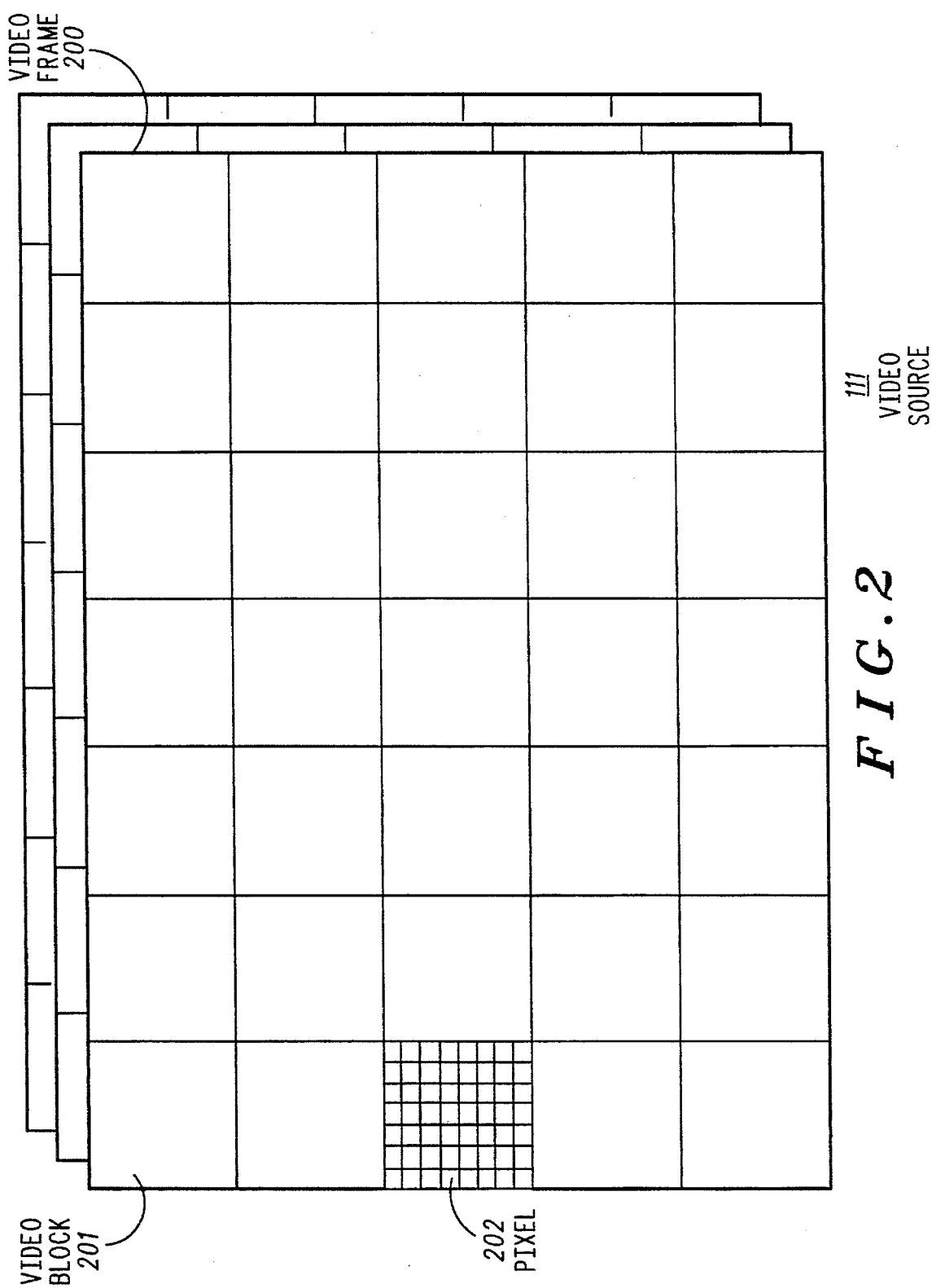
FIG. 2 illustrates an exemplary video source that serves as input for a video compression system implemented in accordance with the present invention.

FIG. 2 illustrates an exemplary video source 111. The video source 111 consists of a series of video frames 200. Each video frame 200 is composed of a two-dimensional array of pixels 202. Common sizes for the video frame 200 include 352 pixels horizontally by 240 pixels vertically, referred to as Standard Image Format (SIF), 352 by 288 pixels, referred to as Common Interchange Format (CIF), and 176 by 144 pixels, referred to as Quarter CIF (QCIF). The video frames are commonly separated in time by $1/24$, $1/25$, or $1/29.97$ seconds. Each video frame 200 can be divided into regions, where each region is referred to as a video block 201. In the H.261, MPEG-1, and MPEG-2 standards the video block 201 is called a macroblock and consists of a 16 by 16 array of pixels.

Figure 3:
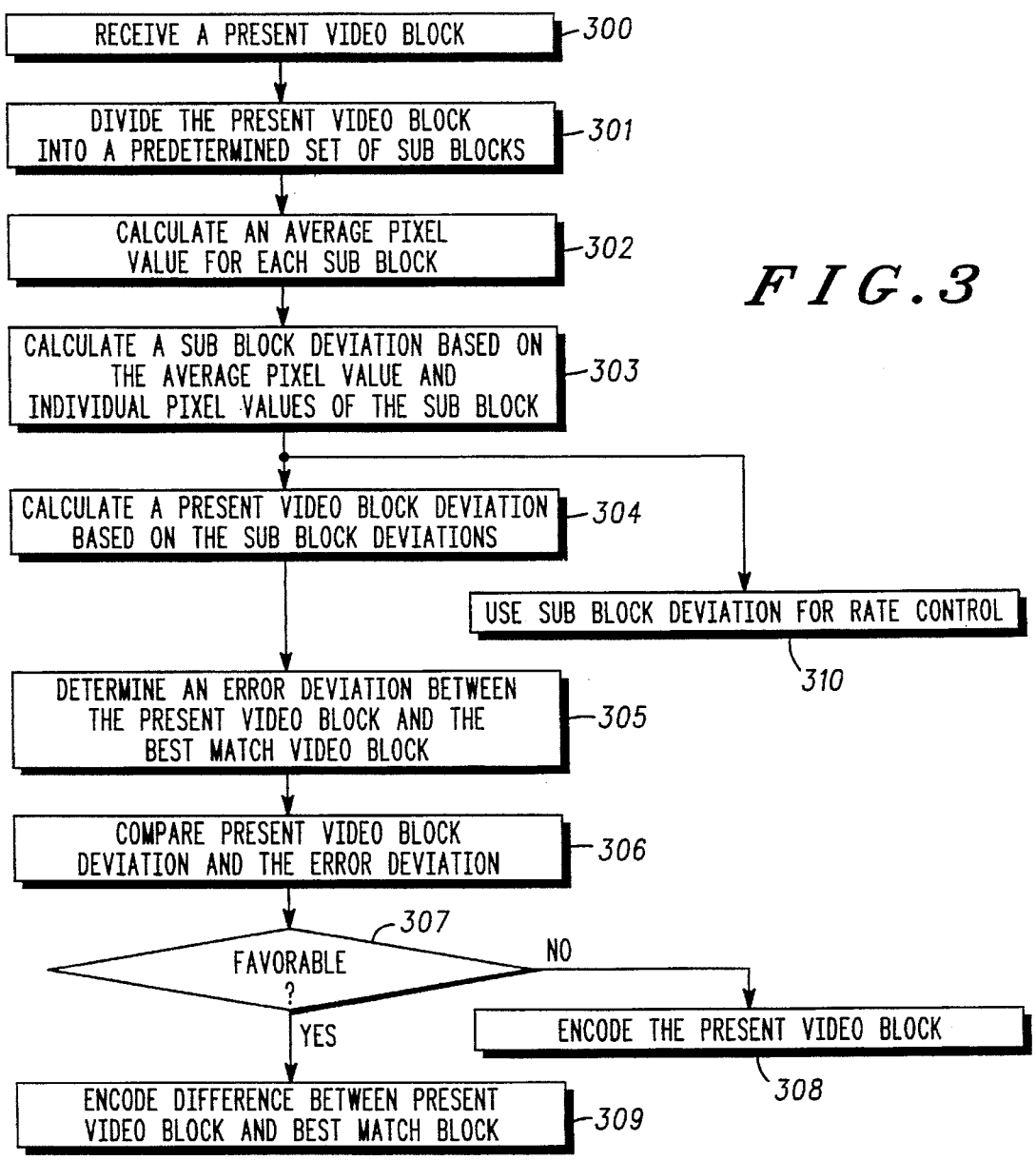
FIG. 3 illustrates a flow diagram for determining whether to intra code or non-intra code a video block in accordance with the present invention.

FIG. 3 illustrates a flow diagram used by the intra/non-intra determiner 113 for determining whether to encode the present video block or whether to encode the differences between the present video block and the best match video block. First a present video block is received from an incoming video source 300. In contrast to the prior art, the present video block is then divided into a predetermined number of sub blocks 301. Where a macroblock or 16×16 video block is used, the preferred number of sub blocks is four and each sub block is 8 pixels by 8 pixels.

An average pixel value is calculated for each sub block 302. The average pixel value is determined by adding all the individual pixel values in the sub block and dividing by the total number of pixels in the sub block. Then a sub block deviation is calculated based on the average pixel value and individual pixel values of the sub block 303. The preferred sub block deviation is calculated as the sum of absolute differences (SOAD). The SOAD is determined by adding the absolute values of the differences between the individual pixel values of the sub block and the average pixel value for the sub block. An alternate sub block deviation is calculated by squaring the differences between the average pixel value and the individual pixel values and summing the results. This calculation is referred to as the mean square error.

The sub block deviations may preferably be sent to the rate controller 114 to be used for rate control 310. The rate controller uses the sub block deviations as a measure of the spatial activity within a sub block. By using the sub block deviations from the intra/non-intra determiner 113, the rate controller 114 does not have to recalculate a spatial activity measure. Based on the spatial activity and other factors, the level of quantization used by the quantizer 103 is determined.

Once the sub block deviation is calculated for each sub block 303, a present video block deviation is calculated 304. The present video block deviation is a function of the sub block deviations, and is preferably a sum of the sub block deviations.

An error deviation is determined using the present video block and the best match video block 305. The error deviation should be of the same order as the sub block deviation. If the SOAD is used for determining the sub block deviation, then the error deviation should be calculated as the sum of the absolute values of the difference between each present video block pixel and the corresponding pixel location in the best match video block. Similarly, if the sub block deviation is calculated as the sum of the squares of the difference between the average pixel value and the individual pixel values, then the error deviation should be calculated as the sum of the squares of the difference between each pixel in the present video block and each corresponding pixel in the best match video block. In contrast to the present video block deviation, the error deviation calculation yields the same result whether or not the present video block is subdivided into sub blocks.

A comparison is made of the present video block deviation and the error deviation 306. A determination is made whether the comparison is favorable or not 307. If the comparison is favorable, then the difference between the present video block and the best match video block is subsequently encoded 309. If the comparison is unfavorable, then the present video block is encoded 309. The determination of favorable or unfavorable is discussed below with reference to FIG. 4.

Figure 4:
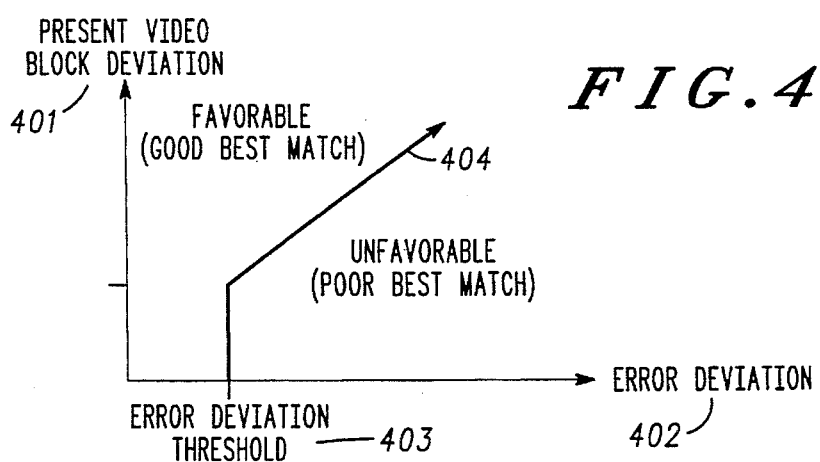
FIG. 4 illustrates a decision curve for determining whether to intra code or non-intra code a video block in accordance with the present invention.

FIG. 4 illustrates the preferred decision curve for determining whether the comparison of the error deviation and the present video block deviation 306 is favorable. The horizontal axis is the error deviation 402 and the vertical axis is the present video block deviation 401. As shown by the curve 404, if the error deviation is greater than the present video block deviation, and greater than the error deviation threshold, then a poor best match video block was found by the motion estimator 110 and the comparison is considered unfavorable. Conversely, if the error deviation is equal to or less than the present video block deviation or equal to or less than the error deviation threshold 403, a good best match video block was found by the motion estimator 110 and the comparison is favorable. The preferred value for the error deviation threshold 403 is 2048 if the SOAD is used to calculate the present video block deviation and the error deviation.

With the present invention, an efficient intra/non-intra decision is made. Since the rate controller 114 and the intra/non-intra determiner 113 may share the sub block deviation computation, the 1024 operations used in the prior art to compute the SOAD over the entire video block are reduced to 4 additions. This is a substantial savings in computation for the video compression system 100.

We claim:

1. In a video encoder, a method for determining, for an incoming video frame, whether a present video block of the incoming video frame will be encoded or whether a difference between the present video block and a best match video block of a previously stored video frame will be encoded, the method comprising the steps of:
   a) for the present video block, dividing the present video block into a predetermined set of sub blocks;
   b) for each sub block of the predetermined set of sub blocks, calculating an average pixel value;
   c) for each sub block of the predetermined set of sub blocks, calculating a sub block deviation based on the average pixel value and individual pixel values of the sub block;
   d) for the present video block, calculating a present video block deviation based on the sub block deviation for each of the sub blocks in the predetermined set of sub blocks;
   e) determining an error deviation between the present video block and the best match video block;
   f) when a comparison of the present video block deviation to the error deviation is unfavorable, encoding the present video block; and
   g) when the comparison of the present video block deviation to the error deviation is favorable, encoding the difference between the present video block and the best match video block.

2. In the method of claim 1, step (a) further comprises defining the predetermined set of sub blocks as four sub blocks.

3. In the method of claim 1, step (c) further comprises using the sub block deviation for rate control.

4. In the method of claim 1, step (c) further comprises using the sub block deviation to control quantization.

5. In the method of claim 1, step (c) further comprises calculating the sub block deviation as a sum of absolute differences between the average pixel value and individual pixel values of the sub block.

6. In the method of claim 1, step (c) further comprises calculating the sub block deviation as a mean square error between the average pixel value and individual pixel values of the sub block.

7. In the method of claim 1, step (d) further comprises calculating the present video block deviation by summing the sub block deviations for each of the sub blocks in the predetermined set of sub blocks.

8. In the method of claim 1, step (f) further comprises defining unfavorable as a poor best match video block.

9. In the method of claim 1, step (g) further comprises defining favorable as a good best match video block.

10. A method for compressing video, the method comprising the steps of:
   a) receiving a video frame that includes a plurality of video blocks; for each video block of the plurality of video blocks:
   b) determining a best match video block from comparisons between the each video block and a plurality of video blocks from a previously stored video frame;
   c) dividing the each video block into a predetermined set of sub blocks;
   d) for each sub block of the predetermined set of sub blocks, calculating an average pixel value;
   e) for each sub block of the predetermined set of sub blocks, calculating a sub block deviation based on the average pixel value and individual pixel values of the sub block;
   f) calculating a present video block deviation based on the sub block deviation for each of the sub blocks in the predetermined set of sub blocks;
   g) determining an error deviation between the each video block and the best match video block;
   h) when a comparison of the present video block deviation to the error deviation is unfavorable, encoding the each video block; and
   i) when the comparison of the present video block deviation to the error deviation is favorable, encoding the difference between the each video block and the best match video block.

11. A video compression system comprising:
   a motion estimator that receives a present video block and compares it to a plurality of previously stored video blocks to produce a best match video block; and
   an intra/non-intra determiner, operably connected to the motion estimator, that receives the present video block and the best match video block and that determines whether to encode the present video block or whether to encode a difference between the best match video block and the present video block, where the intra/non-intra determiner:
   a) divides the present video block into a predetermined set of sub blocks;
   b) calculates an average pixel value for each sub block of the predetermined set of sub blocks;
   c) calculates a sub block deviation based on the average pixel value and individual pixel values of the sub block, for each sub block of the predetermined set of sub blocks;
   d) calculates a present video block deviation based on the sub block deviation for each of the sub blocks in the predetermined set of sub blocks;
   e) determines an error deviation between the present video block and the best match video block;

f) compares the present video block deviation to the error deviation to produce a comparison deviation;

g) determines that the present video block is to be encoded when the comparison deviation is unfavorable; and h) determines that the difference between the present video block and the best match video block is to be encoded when the comparison deviation is favorable.

* * * * *